G. W. LINDLEY.
PNEUMATIC TIRE.
APPLICATION FILED SEPT. 18, 1919.

1,395,686.

Patented Nov. 1, 1921.

INVENTOR
George W. Lindley
BY
Francis D. Chambers
his ATTORNEY

UNITED STATES PATENT OFFICE.

GEORGE W. LINDLEY, OF PHILADELPHIA, PENNSYLVANIA.

PNEUMATIC TIRE.

1,395,686.  Specification of Letters Patent.  Patented Nov. 1, 1921.

Application filed September 18, 1919. Serial No. 324,292.

*To all whom it may concern:*

Be it known that I, GEORGE W. LINDLEY, a citizen of the United States of America, residing in Philadelphia, county of Philadelphia, and State of Pennsylvania, have invented certain new and useful Improvements in Pneumatic Tires, of which the following is a true and exact description, reference being had to the accompanying drawings, which form a part thereof.

My invention relates to pneumatic tires of the kind known as "cord tires", and has for its object to provide a tire of the character in which the cords will be accurately spaced and an exceptionally strong tire therefore insured. As heretofore constructed attempts to secure accurate spacing of the cords have been made by weaving the cords into a fabric, but such a fabric is necessarily of loose texture, and it has been found that the cords can and do shift their position in the fabric so as to result in defective spacing. My invention consists in forming a tire of layers of fabric each made up of parallel equally spaced weft or shuttle threads or cords and of parallel running lines of knitted threads through parallel loops of which the cord threads pass so as to be securely held in spaced relation to each other, said fabric being cut on the bias and different layers being so incorporated in the tire that the cords of different bias cut strips will cross each other.

The nature of my invention will be best understood as described in connection with the drawings in which—

Figure 4:
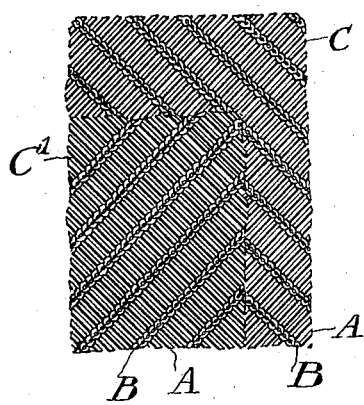
Figure 5:
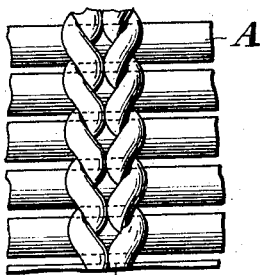

Fig. 4 a view showing how the strips are laid one upon the other in building up the tire, and Fig. 5 is a view on a larger scale showing the engagement of a series of cords with a line of knotted loops.

A, A, A, etc., are the cords of the fabric which extend from side to side of the cloth and are laid into the loop of the knitted threads B, B, B, etc., during the process of knitting, the cords passing from side to side before each loop forming action of the knitting needles and forming weft or shuttle threads passing through a series of parallel knitted loops. The threads knitted into chains of loops can be much thinner than the cords which they hold in parallel alinement with each other, and they can be spaced as widely apart as may be deemed advisable, as their function is merely to hold the cords properly spaced from each other and incorporated into a fabric which is sufficiently coherent for the necessary handling it is to receive.

Figure 1:
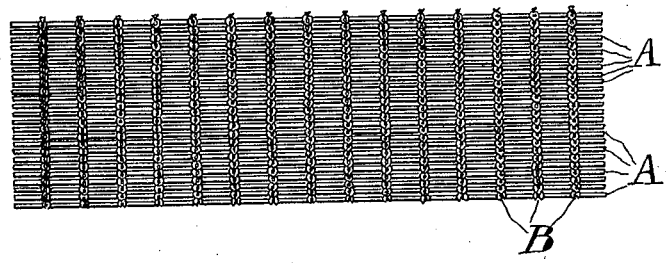
Figure 1 is a face view of a fabric of the kind I use in making my improved tires.
Figure 2:
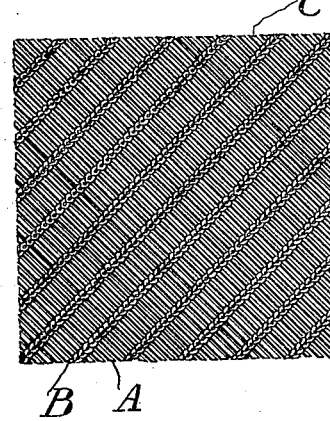
Fig. 2 is a face view of one of the strips into which the fabric is cut by bias cuts.
Figure 3:
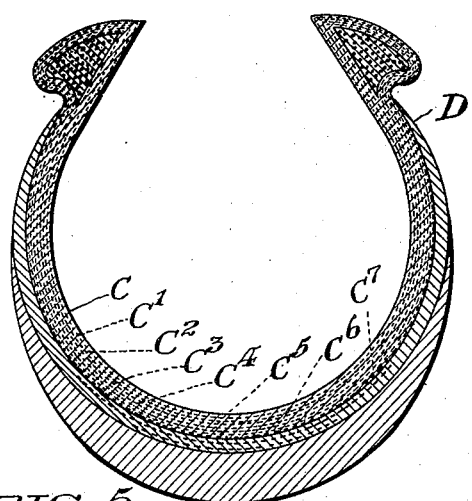
Fig. 3 is a sectional elevation of the tire.

C, Fig. 2, indicates one of the strips into which the fabric described is cut up by bias cuts. Other similar strips as indicated are $C'$, $C^2$, $C^3$, $C^4$, $C^5$, $C^6$ and $C^7$. D is the tire built up of three strips in the usual manner, the strips being laid upon each so that the cords of different strips cross each other as shown in Fig. 4.

It will be clear that by securing the parallel cords together by the knitted threads they are held evenly spaced apart and are free from all tendency to slip toward or away from each other with consequent formation of weak spots in the tire into which they are incorporated.

The fabric described above, that is one composed of transverse weft threads running from side to side of a cloth fabric of standard width and incorporated in the loops of lines of knitted threads, can be made not only with the lines of knitted threads widely spaced, as shown, and as is best for use in tire construction, but also with the knitted threads closely spaced so as to form a cloth of compact even texture, and in either form the cloth fabric is, I believe, new with me and will form the subject matter of a separate application for Letters Patent.

Having now described my invention, what I claim as new and desire to secure by Letters Patent, is:

1. A cord tire having its cord layers made up of a cloth fabric composed of parallel weft or shuttle threads or cords and of parallel running lines of knitted threads through parallel rows of loops of which the weft threads or cords pass, said cloth fabric being cut on the bias and incorporated in the tire so that the lines of cords of different bias cut strips of fabric cross each other.

2. A cord tire having its cord layers made up of a cloth fabric composed of closely lying parallel weft or shuttle threads or cords and of widely spaced parallel running lines of knitted threads through parallel rows of loops of which the weft threads or cords pass, said cloth fabric being cut on the bias and incorporated in the tire so that the lines of cords of different bias cut strips of fabric cross each other.

GEORGE W. LINDLEY.